United States Patent
Mitsuya

(10) Patent No.: US 12,475,618 B2
(45) Date of Patent: Nov. 18, 2025

(54) ANALYSIS SUPPORT DEVICE AND ANALYSIS SUPPORT SYSTEM

(71) Applicant: FUJI CORPORATION, Chiryu (JP)

(72) Inventor: Takafumi Mitsuya, Nishio (JP)

(73) Assignee: FUJI CORPORATION, Chiryu (JP)

( * ) Notice: Subject to any disclaimer, the term of this patent is extended or adjusted under 35 U.S.C. 154(b) by 28 days.

(21) Appl. No.: 18/682,045

(22) PCT Filed: Oct. 1, 2021

(86) PCT No.: PCT/JP2021/036424
§ 371 (c)(1),
(2) Date: Feb. 7, 2024

(87) PCT Pub. No.: WO2023/053443
PCT Pub. Date: Apr. 6, 2023

(65) Prior Publication Data
US 2024/0378774 A1    Nov. 14, 2024

(51) Int. Cl.
*G06T 11/20* (2006.01)
*G05B 19/406* (2006.01)

(52) U.S. Cl.
CPC .......... *G06T 11/206* (2013.01); *G05B 19/406* (2013.01); *G05B 2219/32119* (2013.01)

(58) Field of Classification Search
CPC ................ G06T 11/206; G05B 19/406; G05B 2219/32119; H05K 13/083
See application file for complete search history.

(56) References Cited

U.S. PATENT DOCUMENTS 9,524,570 B1 * 12/2016 Callaghan ............. G06T 11/206

FOREIGN PATENT DOCUMENTS

| CN | 108009739 A | * | 5/2018 | ..... G06Q 10/063114 |
|---|---|---|---|---|
| EP | 3695805 A1 | * | 8/2020 | .......... G05B 19/401 |
| JP | 2004-6557 A | | 1/2004 | |
| WO | WO-2014034059 A1 | * | 3/2014 | .......... H04L 67/025 |
| WO | WO-2014049768 A1 | * | 4/2014 | ......... H05K 13/0895 |

OTHER PUBLICATIONS

International Search Report issued Dec. 21, 2021 in PCT/JP2021/036424, filed on Oct. 1, 2021, 2 pages.

* cited by examiner

*Primary Examiner* — Jeffery A Brier
(74) *Attorney, Agent, or Firm* — Oblon, McClelland, Maier & Neustadt, L.L.P.

(57) ABSTRACT

An analysis support device includes a display; a first display control section configured to display a first screen including a device scheduled image and a device actual result image on the display when a device actual result time at which a mounting device actually performs a mounting step of mounting a component on a substrate is delayed; and a second display control section configured to display a second screen including a preparation scheduled image and a preparation actual result image on the display when a predetermined first instruction is given by a user after the first screen is displayed on the display, the preparation scheduled image indicating a preparation scheduled time at which a preparation step, which is preparation for the mounting step, is to be performed, and the preparation actual result image indicating a preparation actual result time at which the preparation step is actually performed.

6 Claims, 9 Drawing Sheets

ANALYSIS SUPPORT DEVICE AND ANALYSIS SUPPORT SYSTEM

TECHNICAL FIELD

The technology disclosed in the present description relates to an analysis support device and an analysis support system for supporting analysis performed by a user in a mounting step in which a mounting device mounts a component on a substrate.

BACKGROUND ART

Patent Literature 1 discloses a time chart illustrating a step state of a multi-product variate production line. This step includes a setup step before production of a circuit board and a step during production of the circuit board.

PATENT LITERATURE

Patent Literature 1: JP-A-2004-6557

BRIEF SUMMARY

Technical Problem

In the technology described above, a time chart indicating the state of the step is merely presented to the user. For example, an actual time for producing the circuit board may be delayed from a scheduled time. In this case, the user cannot analyze the cause of the delay only by viewing the time chart.

The present description provides a technology for supporting analysis by a user of a cause of a delay in actual result time of a mounting step from a scheduled time.

Solution to Problem

According to an aspect of the present description, there is provided an analysis support device including: a display; a first display control section configured to display a first screen including a device scheduled image and a device actual result image on the display when a device actual result time at which a mounting device actually performs a mounting step of mounting a component on a substrate is delayed from a device scheduled time at which the mounting device is to perform the mounting step, the device scheduled image indicating the device scheduled time, the device actual result image indicating the device actual result time, and the device actual result time being longer than the device scheduled time; and a second display control section configured to display a second screen including a preparation scheduled image and a preparation actual result image on the display when a predetermined first instruction is given by a user after the first screen is displayed on the display, the preparation scheduled image indicating a preparation scheduled time at which a preparation step, which is preparation for the mounting step, is to be performed, and the preparation actual result image indicating a preparation actual result time at which the preparation step is actually performed.

For example, as a cause of the delay in the mounting step, a delay in the preparation step which is a preparation for the mounting step is considered. With the configuration, the user can know the delay of the mounting step by viewing the first screen. Then, the user can view the second screen by giving the first instruction after the first screen is displayed. By viewing the second screen, the user can know the presence or absence of the delay in the preparation step as the cause of the delay in the mounting step. For example, when the preparation actual result time is longer than the preparation scheduled time on the second screen, the user can know that there is the delay in the preparation step as one of the causes of the delay in the mounting step. As described above, it is possible to support the user in analyzing the cause of the delay of the actual result time of the mounting step from the scheduled time.

According to another aspect of the present description, there is provided an analysis support system including: a simulation device configured to simulate a device scheduled time at which a mounting device is to perform a mounting step of mounting a component on a substrate, and a preparation scheduled time at which a preparation step, which is preparation for the mounting step, is to be performed; a calculation device configured to calculate a device actual result time at which the mounting device actually performs the mounting step and a preparation actual result time at which the preparation step is actually performed using state information indicating an actual operation state of the mounting device and an actual preparation state in the preparation step; and an analysis support device configured to communicate with the simulation device and the calculation device, in which the analysis support device includes a display, a first display control section configured to display a first screen including a device scheduled image and a device actual result image on the display when the device actual result time is delayed from the device scheduled time, the device scheduled image indicating the device scheduled time, the device actual result image indicating the device actual result time, and the device actual result time being longer than the device scheduled time, and a second display control section configured to display a second screen including a preparation scheduled image and a preparation actual result image on the display when a predetermined first instruction is given by a user after the first screen is displayed on the display, the preparation scheduled image indicating the preparation scheduled time, and the preparation actual result image indicating the preparation actual result time.

Also in the above configuration, it is possible to support the analysis by the user of the cause of the delay of the actual result time of the mounting step from the scheduled time. In particular, it is possible to support analysis of the user based on the scheduled time simulated by the simulation device.

DESCRIPTION OF EMBODIMENTS

Figure 1:
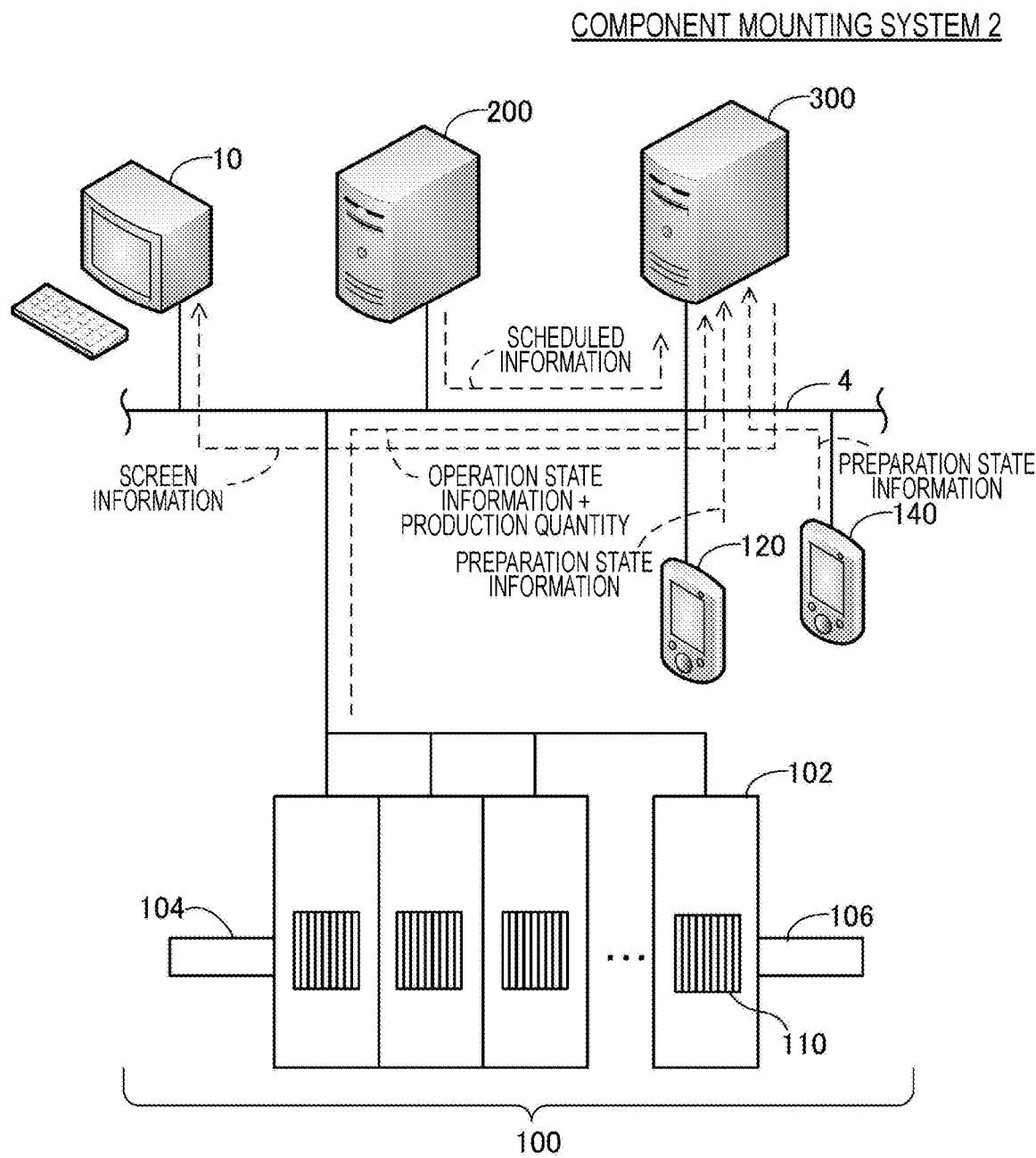
FIG. 1 illustrates a component mounting system according to an embodiment.

Main features of an embodiment described below are listed. Technical elements described below are technical elements independent of each other, exhibit technical usefulness alone or in various combinations, and are not limited to combinations described in claims at the time of filing.

(Feature 1) The preparation scheduled image and the preparation actual result image may be boxes, a first end of the preparation scheduled image may indicate a start scheduled time at which the preparation step is to be started, a second end of the preparation scheduled image may indicate an end scheduled time at which the preparation step is to be ended, a first end of the preparation actual result image may indicate an actual start time of the preparation step, and a second end of the preparation actual result image may indicate an actual end time of the preparation step.

With such a configuration, the user can know the presence or absence of a delay from the scheduled time of the preparation step with the preparation step as one unit.

(Feature 2) The preparation step may include, for each of two or more subjects, multiple partial steps handled by the subject, the preparation scheduled image may include multiple scheduled boxes corresponding to the multiple partial steps, for each of the multiple scheduled boxes, a first end of the scheduled box may indicate a start scheduled time at which the partial step corresponding to the scheduled box is to be started, and a second end of the scheduled box may indicate an end scheduled time at which the partial step corresponding to the scheduled box is to be ended, the preparation actual result image may include multiple actual result boxes corresponding to the multiple partial steps, and for each of the multiple actual result boxes, a first end of the actual result box may indicate an actual start time of the partial step corresponding to the actual result box, and a second end of the actual result box may indicate an actual end time of the partial step corresponding to the actual result box.

With such a configuration, the user can know the presence or absence of a delay for each of the multiple partial steps handled by the subject, with the subject as one unit.

(Feature 3) The analysis support device may further include a third display control section configured to display a third screen not including the preparation actual result image and the preparation scheduled image on the display when a predetermined second instruction is given by the user after the first screen is displayed on the display, in which the third screen may include information related to an abnormality occurring inside the mounting device.

For example, there is a case where the cause of the delay in the mounting step is not the delay in the preparation step but an abnormality occurring inside the mounting device. With the configuration, the user can know the presence or absence of an abnormality occurring inside the mounting device as a cause of a delay in the mounting step by viewing the third screen.

(Feature 4) The analysis support device may further include a fourth display control section configured to selectively display the second screen or the third screen based on state information indicating an actual operation state of the mounting device and an actual preparation state in the preparation step when a predetermined third instruction is given by the user after the first screen is displayed on the display.

With such a configuration, the second screen or the third screen is selectively displayed by the analysis support device. The user need not select which of the second screen and the third screen is to be displayed. The convenience of the user can be improved.

Figure 2:
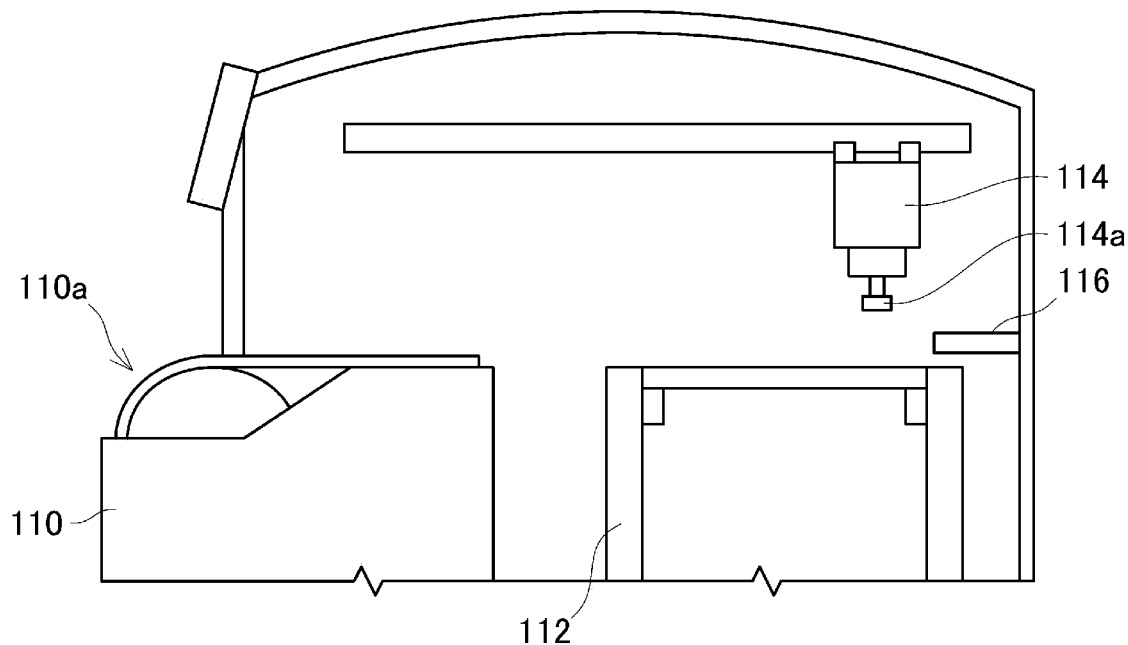
FIG. 2 is a conceptual diagram of a mounting module.

Embodiment (Component Mounting System 2: FIGS. 1 and 2)

As illustrated in FIG. 1, component mounting system 2 includes analysis support device 10, mounting device 100, picking terminal 120, setup terminal 140, simulation device 200, and calculation device 300. Each of devices 10, 100, 120, 140, 200, and 300 is connected to local area network 4 (hereinafter referred to as "LAN 4"). Devices 10 and 100 can communicate with each other via LAN 4.

Analysis support device 10 is a terminal device such as a desktop PC, a laptop PC, a tablet terminal, a smartphone, or a handy terminal. Simulation device 200 and calculation device 300 are servers. In a modification example, simulation device 200 and calculation device 300 may be a terminal device such as a desktop PC. Mounting device 100 is a device capable of performing a mounting step of mounting an electronic component on a substrate and producing a circuit board.

Mounting device 100 includes multiple mounting modules 102, carry-in device 104 that carries the substrate into first mounting module 102 among multiple mounting modules 102, and carry-out device 106 that carries out a circuit board produced by multiple mounting modules 102.

FIG. 2 is a schematic diagram of a cross section of mounting module 102 as viewed from a direction in which multiple mounting modules 102 are arranged side by side (left-right direction in FIG. 1). Mounting module 102 includes multiple cassettes 110, support table 112, mounting unit 114, and nozzle box 116. Component feeder 110a can be attached to each of multiple cassettes 110. Component feeder 110a accommodates multiple electronic components. In the production of the circuit board, some of multiple cassettes 110 may be used, or all of multiple cassettes 110 may be used.

Support table 112 is a table for supporting a substrate carried-in from carry-in device 104 or immediately preceding mounting module 102. Mounting unit 114 mounts the electronic component supplied from component feeder 110a on the substrate on support table 112. Nozzle 114a for picking up an electronic component in component feeder 110a is attached to the tip of mounting unit 114. There are various types of nozzles 114a. A specific type of nozzle 114a is selected from various nozzles 114a according to the type of electronic component which is a pickup target. Nozzle box 116 is a box that accommodates multiple nozzles 114a used in production of the circuit board. Nozzle box 116 is a detachable cartridge.

Returning to FIG. 1, the description will be continued. Simulation device 200 simulates, for each of multiple operation states of mounting device 100, a device scheduled time at which mounting device 100 is to operate in the operation state. The multiple operation states include an implementation state in which the mounting device mounts the component on the substrate and a standby state in which the mounting device waits for mounting the component on the substrate. Although details will be described later, the multiple operation states include multiple standby states corresponding to multiple causes.

Various kinds of information used for the simulation of the device scheduled time are input to simulation device 200 by the user of component mounting system 2. The various types of information are, for example, information (for example, model names and specifications of mounting modules 102) related to multiple mounting modules 102, a type of a substrate, a type of an electronic component, a drawing illustrating an arrangement of the electronic component on the substrate, preparation information related to a preparation step of preparing components (that is, the substrate and the electronic component) used in mounting device 100, an environment of a production plant, the number of workers, and the like. In addition, not only various kinds of information input by the user but also past simulation results, work actual results, and the like may be used for the simulation.

Here, the preparation step includes, for example, a picking step, an external setup step, and an internal setup step. The picking step is a step of picking up components used in mounting device 100 from a warehouse that manages stocks of substrates and electronic components. The external setup step includes a step of mounting the electronic component picked up in the picking step on the component feeder, conveying the component feeder to the periphery of mounting device 100, and arranging the component feeder at a predetermined position around mounting device 100. Further, the external setup step includes a step of accommodating multiple nozzles 114a used in the mounting step to be performed in nozzle box 116 and arranging nozzle box 116 at a predetermined position around mounting device 100. The internal setup step includes a step of attaching the one arranged at a predetermined position in the external setup step to carry-in device 104 and mounting module 102. The preparation step may be performed by the worker or may be performed by a robot. The preparation information related to the preparation step includes information (for example, the number of persons, the number of robots, and the capability) related to the worker or the robot executing the preparation step.

Simulation device 200 simulates the device scheduled time for each of the multiple operation states of mounting device 100 by using various kinds of input information. Further, simulation device 200 simulates the scheduled production quantity of the circuit board which is a production target by using the various kinds of input information and the device scheduled time that has been simulated.

In addition, simulation device 200 simulates, for each of the picking step, the external setup step, and the internal setup step, a preparation scheduled time in which the worker is to perform the preparation step, using the various kinds of input information. When the subject of the preparation step is a robot, simulation device 200 simulates a preparation scheduled time at which the robot is to perform the preparation step.

Picking terminal 120 is a terminal used by a worker who executes the picking step. Picking terminal 120 is a terminal device such as a handy terminal. The worker inputs an ID of the component in the warehouse to picking terminal 120 and picks up the component. The ID is encoded by, for example, a barcode. When the subject of the picking step is a robot, a control device that controls the robot may function as a picking terminal.

Setup terminal 140 is a terminal used by a worker who executes the external setup step. Setup terminal 140 is a terminal device such as a handy terminal. When the worker mounts the electronic component on the component feeder, the worker inputs an ID of the component feeder on which the electronic component has been mounted to setup terminal 140. When multiple nozzles 114a are accommodated in nozzle box 116, the worker inputs an ID of accommodated nozzle box 116 to setup terminal 140. When the subject of the external setup step is a robot, a control device that controls the robot may function as the setup terminal.

Calculation device 300 uses the operation state information received from mounting device 100 to calculate, for each of the multiple operation states, a device actual result time at which mounting device 100 is actually operating in the operation state. The operation state information indicates an actual operation state of mounting device 100. The operation state information includes, for example, operation identification information, an actual start time of the operation state, and an actual end time of the operation state. The operation state information also includes error information related to an error occurring inside mounting device 100. The error information indicates, for example, for each of multiple errors that have occurred, an error code for identifying the error and the date and time when the error occurs.

In addition, calculation device 300 calculates a preparation actual result time which is the actual time at which the preparation step is performed, using the preparation state information received from picking terminal 120 and the preparation state information received from setup terminal 140. The preparation state information of picking terminal 120 includes, for each of multiple IDs input to picking terminal 120, the ID, worker identification information for identifying a worker, and input date and time of the ID in association with each other. The preparation state information of setup terminal 140 includes, for each of multiple IDs input to setup terminal 140, the ID, the worker identification information, and the input date and time of the ID in association with each other.

In addition, calculation device 300 generates screen information indicating various screens to be displayed on analysis support device 10 by using the calculated device actual result time, the calculated preparation actual result time, an actual production quantity received from mounting device 100, and the scheduled information received from simulation device 200. The scheduled information includes, for each of multiple operation states, operation identification information for identifying the operation state and a scheduled time of the operation state in association with each other. The scheduled information further includes a scheduled production quantity. Calculation device 300 transmits the generated screen information to analysis support device 10 in response to a display request from analysis support device 10. Accordingly, analysis support device 10 displays a screen indicated by the screen information. For example, the display request is transmitted from analysis support device 10 to calculation device 300 after the mounting step by mounting device 100 is completed. In this case, the user can view the screen displayed on analysis support device 10 after the completion of the mounting step and analyze the completed mounting step. For example, the display request may be periodically transmitted from analysis support device 10 to calculation device 300 during the mounting step. In this case, the screen displayed on analysis support device 10 is periodically updated. The contents of the screen will be described later.

Figure 3:
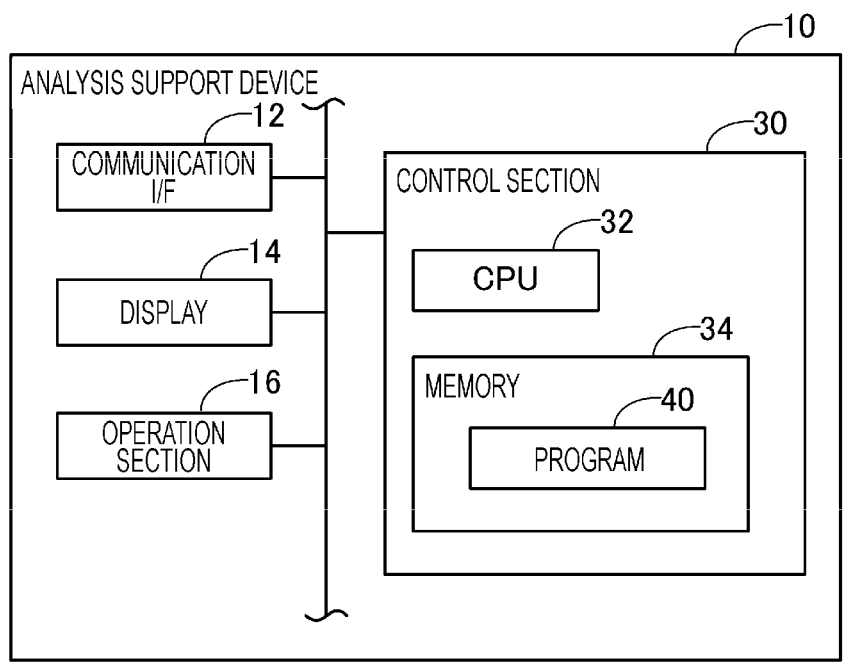
FIG. 3 is a block diagram of an analysis support device.

(Configuration of Analysis Support Device 10: FIG. 3)

Analysis support device 10 includes communication interface 12, display 14, operation section 16, and control section 30. Hereinafter, the "interface" is abbreviated as "I/F".

Communication I/F 12 is I/F for executing communication via LAN 4, and is connected to LAN 4. Display 14 displays various types of information. Operation section 16 includes multiple keys (for example, a keyboard) that receive an instruction from the user. Display 14 may function as a touch screen (that is, operation section 16) for receiving an instruction from the user.

Control section 30 includes CPU 32 and memory 34. CPU 32 executes various types of processing in accordance with program 40 stored in memory 34. Memory 34 includes a volatile memory, a nonvolatile memory, or the like. Program 40 is an application program for using calculation device 300. Program 40 is provided by, for example, a vendor of mounting device 100, and is installed in analysis support device 10 by a user of component mounting system 2. Program 40 may be configured to use simulation device 200. In a modification example, program 40 may be a program installed in analysis support device 10 in advance from a shipping stage of analysis support device 10. For example, program 40 may be a browser program.

Figure 4:
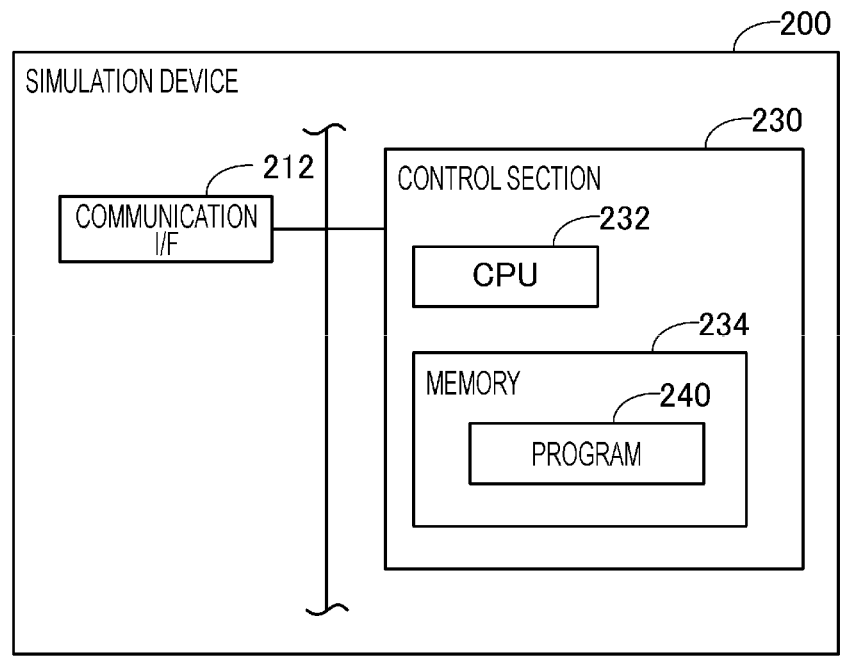
FIG. 4 is a block diagram of a simulation device.

(Configuration of Simulation Device 200; FIG. 4)

Simulation device 200 includes communication I/F 212 and control section 230. Communication I/F 212 is connected to LAN 4. Control section 230 includes CPU 232 and memory 234. Memory 234 stores program 240. Program 240 is an application program for simulating the scheduled time. Program 240 is provided by, for example, a vendor of mounting device 100.

Figure 5:
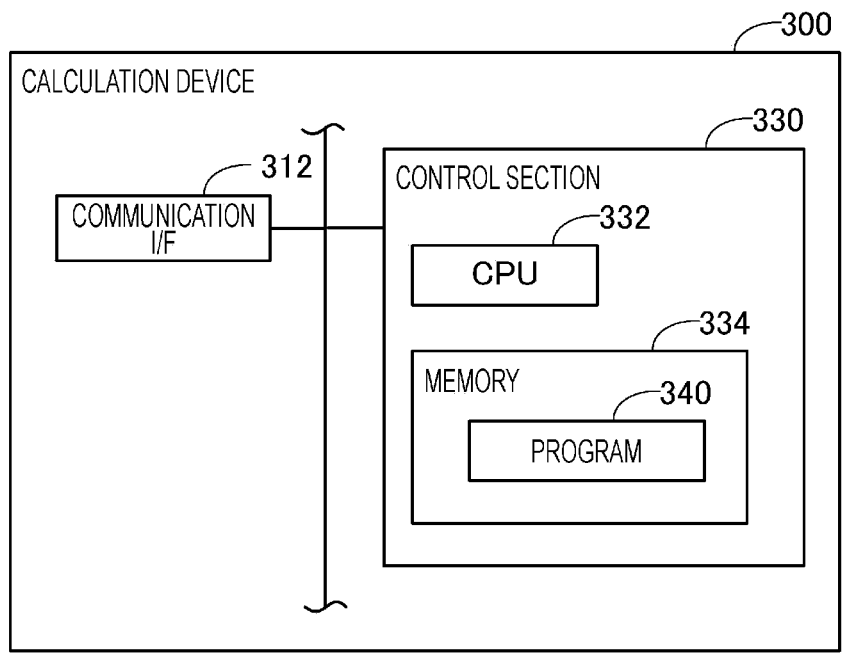
FIG. 5 is a block diagram of a calculation device.

(Configuration of Calculation Device 300; FIG. 5)

Calculation device 300 includes communication I/F 312 and control section 330. Communication I/F 312 is connected to LAN 4. Control section 330 includes CPU 332 and memory 334. Memory 334 stores program 340. Program 340 is an application program for analyzing the actual result time and generating screen information. Program 340 is provided by, for example, a vendor of mounting device 100.

(Each Screen: FIGS. 6 to 12)

Various screens displayed by analysis support device 10 will be described. Upon receiving an instruction to display a screen from the user, analysis support device 10 displays screen SC1 illustrated in FIG. 6 on display 14 according to program 40. Screen SC1 includes graphs G1 and G2 for comparing the production actual result and the production schedule. Horizontal axes of graphs G1 and G2 indicate time, and Vertical axes of graphs G1 and G2 indicate the production quantity. Graph G1 illustrates a transition of scheduled quantity. Graph G1 is generated using the scheduled time simulated by simulation device 200. Graph G2 illustrates the transition of the actual result of the production quantity. Graph G2 is generated using the history of the actual production quantity received by calculation device 300 from mounting device 100.

Graphs G1 and G2 indicate the production actual result and the production schedule for mounting device 100 that is the entirety of multiple mounting modules 102. Further, graphs G1 and G2 can indicate the production actual result and the production schedule for one mounting module of multiple mounting modules 102. Hereinafter, an example in which the production actual result and the production schedule are illustrated for entire mounting device 100 will be described unless otherwise specified.

Figure 6:
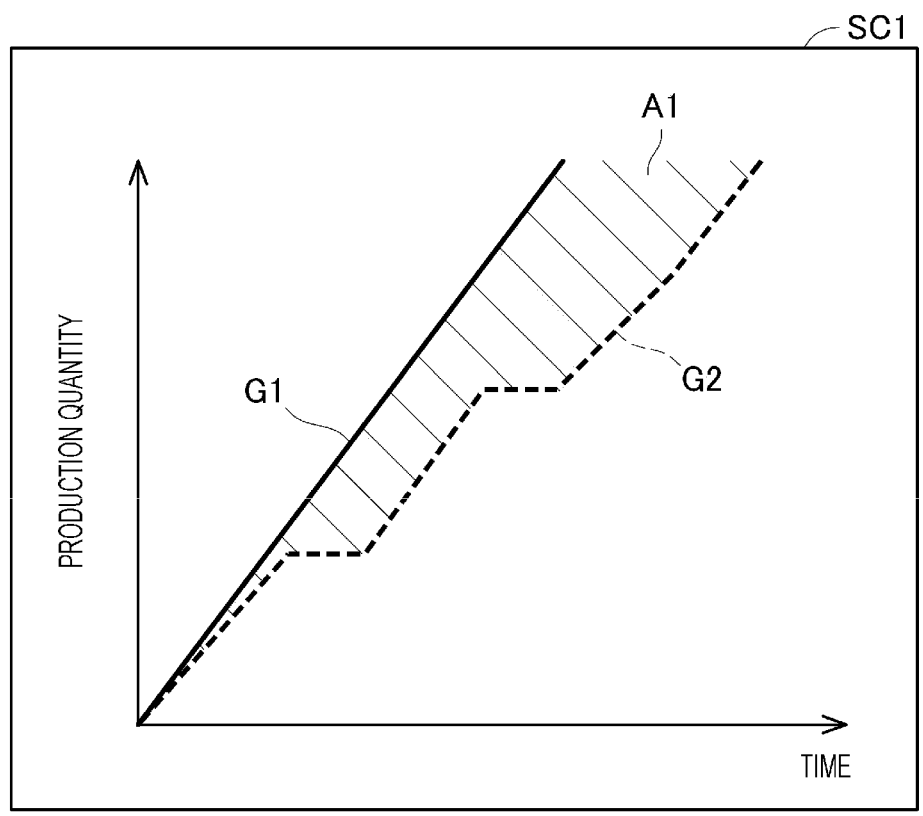
FIG. 6 illustrates a line graph displayed by the analysis support device.

Due to various factors, the progress of production may be delayed from the schedule of production. For example, when the progress of the production is delayed from the schedule of the production, as illustrated in FIG. 6, graph G2 shifts to fall below graph G1. Region A1 between graph G1 and graph G2 indicates a difference between the number of production schedules and the number of production actual results.

Screen SC1 also functions as a graphical user interface (GUI). When region A1 on screen SC1 is selected by the user, analysis support device 10 displays screen SC2 of FIG. 7 in which the state of the mounting step is divided into the multiple operation states on display 14.

Screen SC2 includes pie chart G3 for analyzing a factor in which the progress of production is delayed from the schedule of production. Pie chart G3 indicates, for multiple operation states, the actual result time at which mounting device 100 is actually operating in the operation state as a ratio per unit time. Here, the unit time is, for example, one hour. Pie chart G3 illustrates values of multiple legends L1 to L9 corresponding to multiple operation states.

Legend L1 (Product) indicates an implementation state in which mounting device 100 mounts the electronic component on the substrate. Legend L2 (Wait Previous) indicates a first standby state in which the electronic component is supplied to mounting device 100 but the electronic component waits for being mounted on the substrate due to the fact that the substrate is not carried into mounting device 100. Legend L3 (Wait Next) indicates a second standby state in which the electronic component waits for being mounted on the substrate due to the fact that the preparation of a subsequent device (for example, a reflow device) that performs the step subsequent to the mounting step of mounting device 100 is not completed. Legend L4 (Part Supply) indicates a third standby state in which the electronic component waits for being mounted on the substrate due to shortage of the electronic component. Legend L5 (Operator Downtime) indicates a fourth standby state in which the electronic component waits for being mounted on the substrate due to the fact that an instruction from the operator who operates mounting device 100 is not received. Legend L6 (Machine Error) indicates a fifth standby state in which the electronic component waits for being mounted on the substrate due to occurrence of an abnormality in mounting device 100. Legend L7 (Changeover) indicates a sixth standby state in which the electronic component waits for being mounted on the substrate due to the fact that the step performed in mounting device 100 is switched from the first mounting step to the second mounting step to be performed after the first mounting step. Legend L8 (Maintenance) indicates a seventh standby state in which the electronic component waits for being mounted on the substrate due to the maintenance of mounting device 100 being performed. Legend L9 (Others) indicates an eighth standby state in which the electronic component waits for being mounted on the substrate due to a cause different from any of the causes corresponding to legends L2 to L8.

Figure 7:
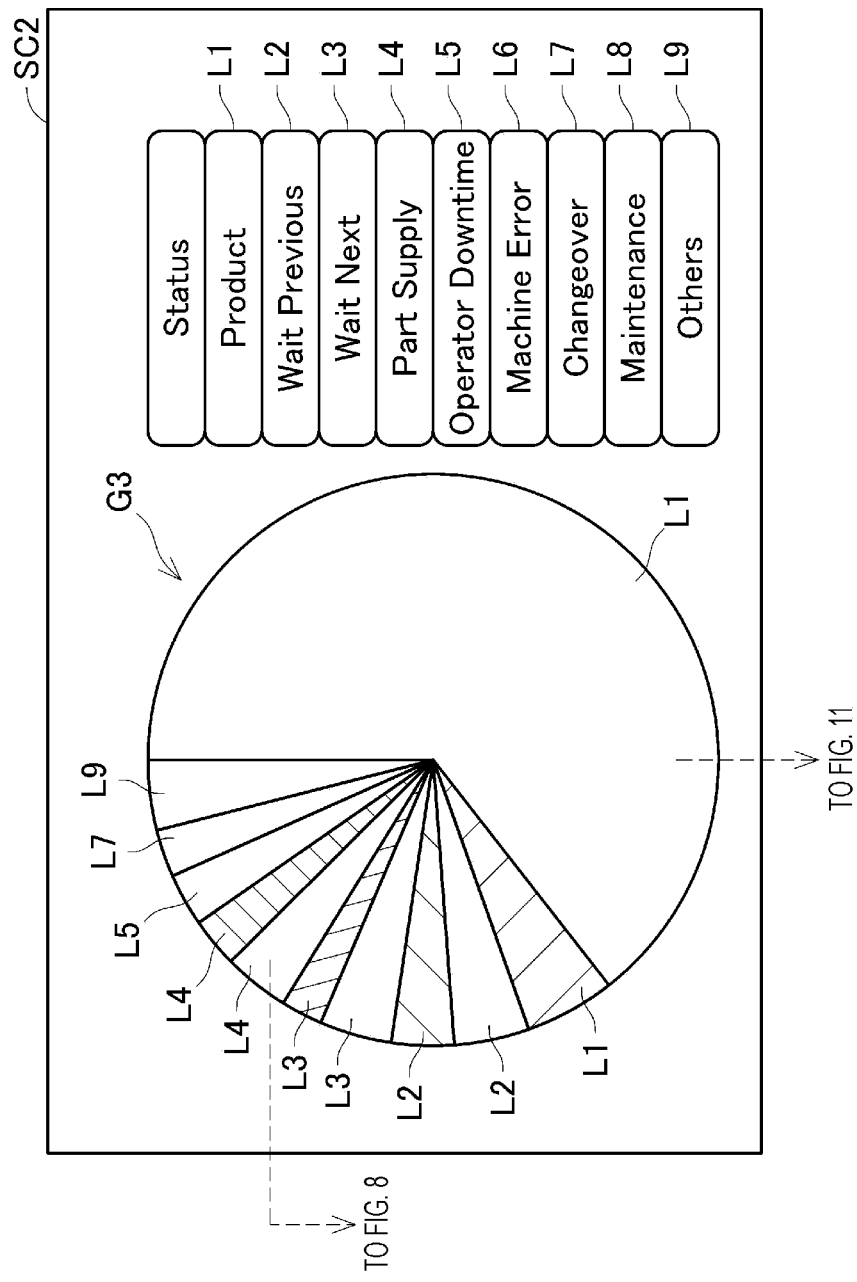
FIG. 7 illustrates a pie chart displayed by the analysis support device.
Figure 8:
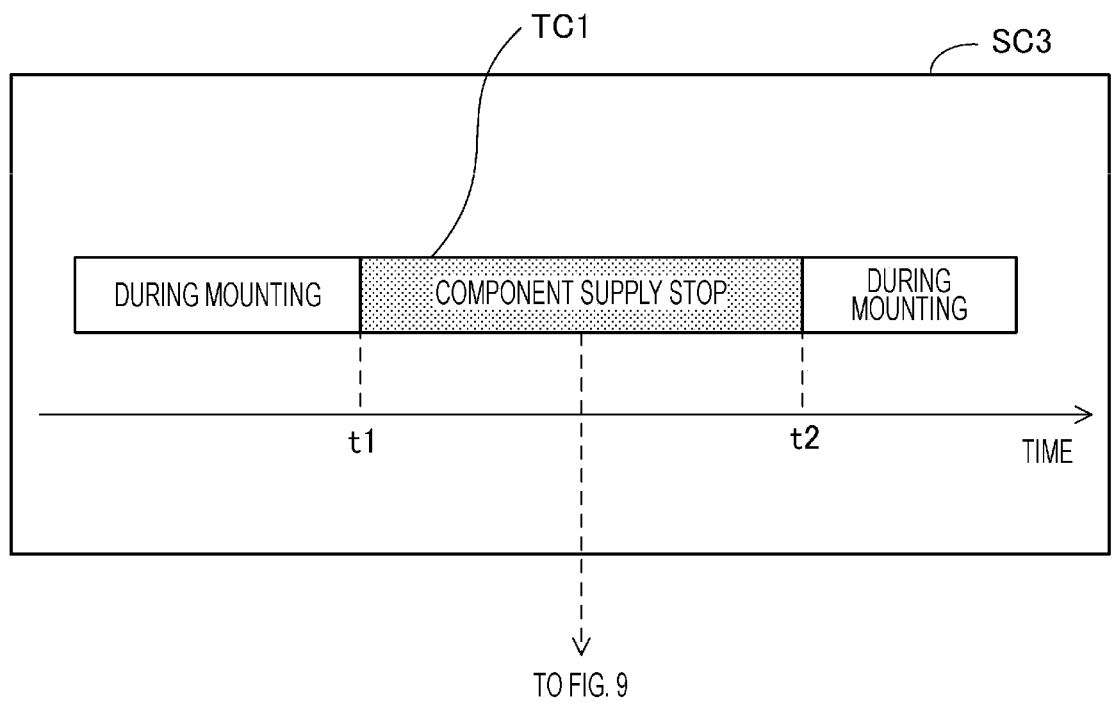
FIG. 8 illustrates a first time chart displayed by the analysis support device.

Pie chart G3 illustrated in FIG. 7 is an example. Pie chart G3 includes an image indicating the ratio of the actual result time per unit time for at least one of legends L1 to L9. In the example of FIG. 7, pie chart G3 includes an image indicating a ratio of the actual result time per unit time for legends L1 to L5, L7, and L9 among legends L1 to L9. In addition, in the example of FIG. 7, for each of the mounting state (legend L1), the second standby state (legend L2), the third standby state (legend L3), and the fourth standby state (legend L4), the device actual result time at which mounting device 100 is actually operated in the operation state is delayed from the device scheduled time in which mounting device 100 is to be operated in the operation state (that is, the device actual result time is longer than the device scheduled time). Here, each scheduled time corresponds to a value simulated by simulation device 200.

In FIG. 7, pie chart G3 includes a scheduled image and an unscheduled image for each of legends L1 to L4. For example, with respect to legend L1 (Product), a portion denoted by reference numeral L1 and not hatched is a scheduled image of legend L1, and a portion denoted by reference numeral L1 and hatched is an unscheduled image of legend L1. The scheduled image of legend L1 indicates a scheduled time at which mounting device 100 is to be operated in the implementation state among the device actual result times corresponding to legend L1. The unscheduled image of legend L1 indicates an unscheduled time other than the scheduled time corresponding to legend L1 among the device actual result times corresponding to legend L1. Here, an image obtained by combining the scheduled image and the unscheduled image indicates the device actual result time. The scheduled images and the unscheduled images of legends L2 to L4 are also denoted by reference numerals, the scheduled images are non-hatched portions, and the unscheduled images are hatched portions. The presence or absence of hatching is merely an example, and for example, the scheduled image and the unscheduled image may have different colors.

For example, the user views pie chart G3 and wants to analyze the cause of the delay in legend 4 (Part Supply). In this case, the user selects an image (that is, a scheduled image or an unscheduled image) corresponding to legend 4 of pie chart G3. In this case, when the image corresponding to legend 4 of pie chart G3 is selected, analysis support device 10 displays screen SC3 of FIG. 8 on display 14.

Screen SC3 includes first time chart TC1. First time chart TC1 represents the transition of the operation state of mounting device 100 in time series. In this case, mounting device 100 stops the supply of the components due to the shortage of the electronic components at time t1 during the operation in the implementation state. Then, at time t2, mounting device 100 resumes the operation in the implementation state due to replenishment of the electronic components.

In this case, since the image corresponding to legend 4 of pie chart G3 is selected by the user, analysis support device 10 enlarges and displays a part of the transition in which mounting device 100 is operating in the third standby state corresponding to legend 4, out of the transitions in the all operation states of mounting device 100. In screen SC3 of FIG. 8, the display of the remaining transition of the transition of the all operation state of mounting device 100 is omitted.

For example, the user desires further analysis and selects first time chart TC1 on screen SC3. When first time chart TC1 is selected, analysis support device 10 displays screen SC4 of FIG. 9 on display 14.

Screen SC4 includes second time chart TC2. Second time chart TC2 includes a scheduled box and an actual result box for each of four steps. The four steps include a picking step, an external setup step, an internal setup step, and a mounting step. In scheduled box B1a for the picking step, the left end indicates a start scheduled time at which the picking step is to be started, and the right end indicates an end scheduled time at which the picking step is to be ended. In actual result box B1b of the picking step, the left end indicates an actual start time of the picking step, and the right end indicates an actual end time of the picking step or a current time during performance. Scheduled box B2a and actual result box B2b of the external setup step, scheduled box B3a and actual result box B3b of the internal setup step, and scheduled box B4a and actual result box B4b of the mounting step in which mounting device 100 mounts the electronic component on the substrate have the same configurations as scheduled box B1a and actual result box B1b of the picking step. As illustrated in first time chart TC1 of FIG. 8, in this case, the supply of the components is stopped between time t1 and time t2, and mounting device 100 is in a standby state. In actual result box B4b of the mounting step, the standby state between time t1 and time t2 is displayed as a blank.

Figure 9:
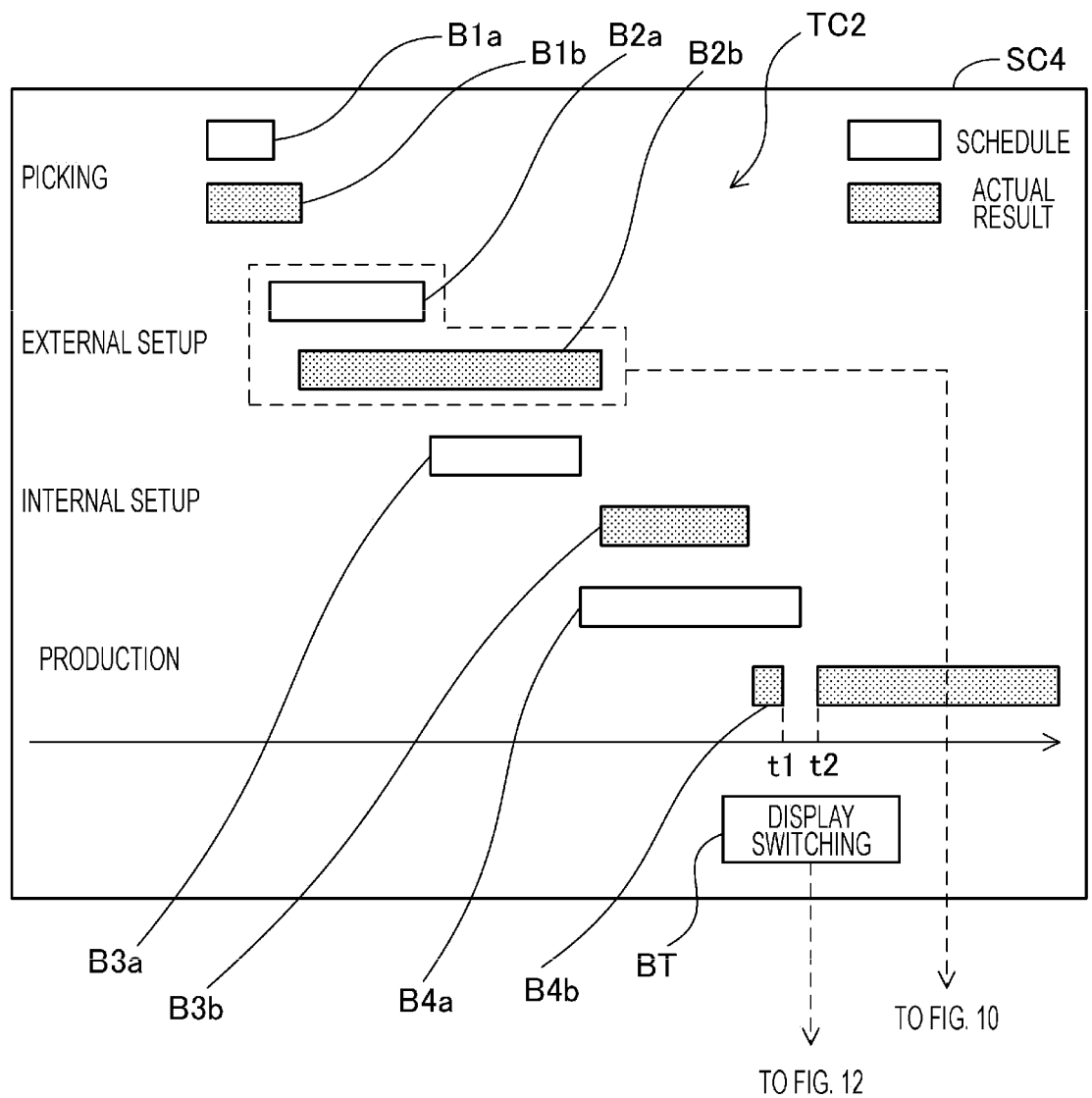
FIG. 9 illustrates a second time chart displayed by the analysis support device.
Figure 10:
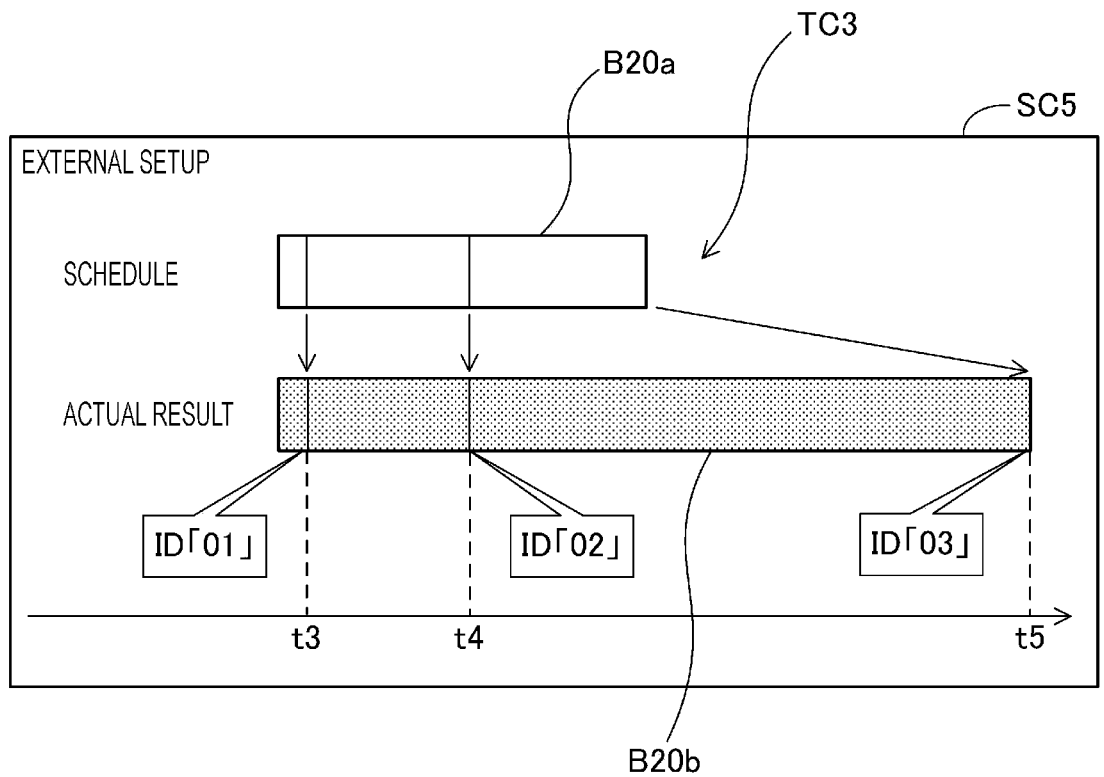
FIG. 10 illustrates a detailed chart displayed by the analysis support device.

In this case, as illustrated in second time chart TC2 of FIG. 9, the preparation actual result time is delayed from the preparation scheduled time in all of the picking step, the external setup step, and the internal setup step. In this case, in particular, in the external setup step, the preparation actual result time is greatly delayed from the preparation scheduled time. The user views scheduled box B2a and actual result box B2b of second time chart TC2 and analyzes that the main cause of the device actual result time being delayed from the device scheduled time is the delay of the external setup step.

For example, the user desires further analysis and selects scheduled box B2a or actual result box B2b on screen SC4. When scheduled box B2a or actual result box B2b is selected, analysis support device 10 displays screen SC5 of FIG. 10 on display 14.

Screen SC5 includes enlarged time chart TC3. Enlarged time chart TC3 includes schedule detail box B20a indicating details of scheduled box B2a of the external setup step, and actual result detail box B20b indicating details of actual result box B2b of the external setup step. In this case, at time t3, the worker inputs ID "01" of the component feeder on which the electronic component is mounted to setup terminal 140. Similarly, at times t4 and t5, the worker inputs IDs "02" and "03" of the component feeders on which the electronic components have been mounted to setup terminal 140. In this case, although the mounting of the electronic components on the component feeders with IDs "01" and "02" is performed as scheduled, the mounting of the electronic component on the component feeder with ID "03" is delayed from the scheduled time. The user views screen SC5 and analyzes that the main cause of the delay of the device actual result time from the device scheduled time is the delay of the mounting of the electronic component on the component feeder of ID "03" during the delay of the external setup step.

Further, for example, the user views pie chart G3 in FIG. 7 and wants to analyze the cause of the delay in legend 1 (Product). In this case, the user selects the image (that is, the scheduled image or the unscheduled image) corresponding to legend 1 of pie chart G3. In this case, when the image corresponding to legend 1 of pie chart G3 is selected, analysis support device 10 displays screen SC6 of FIG. 11 on display 14.

Screen SC6 includes error table ET related to an abnormality (error) occurring inside mounting device 100. Error table ET displays, for each of the multiple types of errors that have occurred, an error code for identifying the error, an occurrence rate of the error, and the number of occurrences of the error in association with each other. The occurrence rate and the number of occurrences in error table ET are calculated by calculation device 300 using the operation state information. The user views error table ET and analyzes the presence or absence of an abnormality that has occurred inside mounting device 100 as a main cause of the device actual result time being delayed from the device scheduled time.

Figure 12:
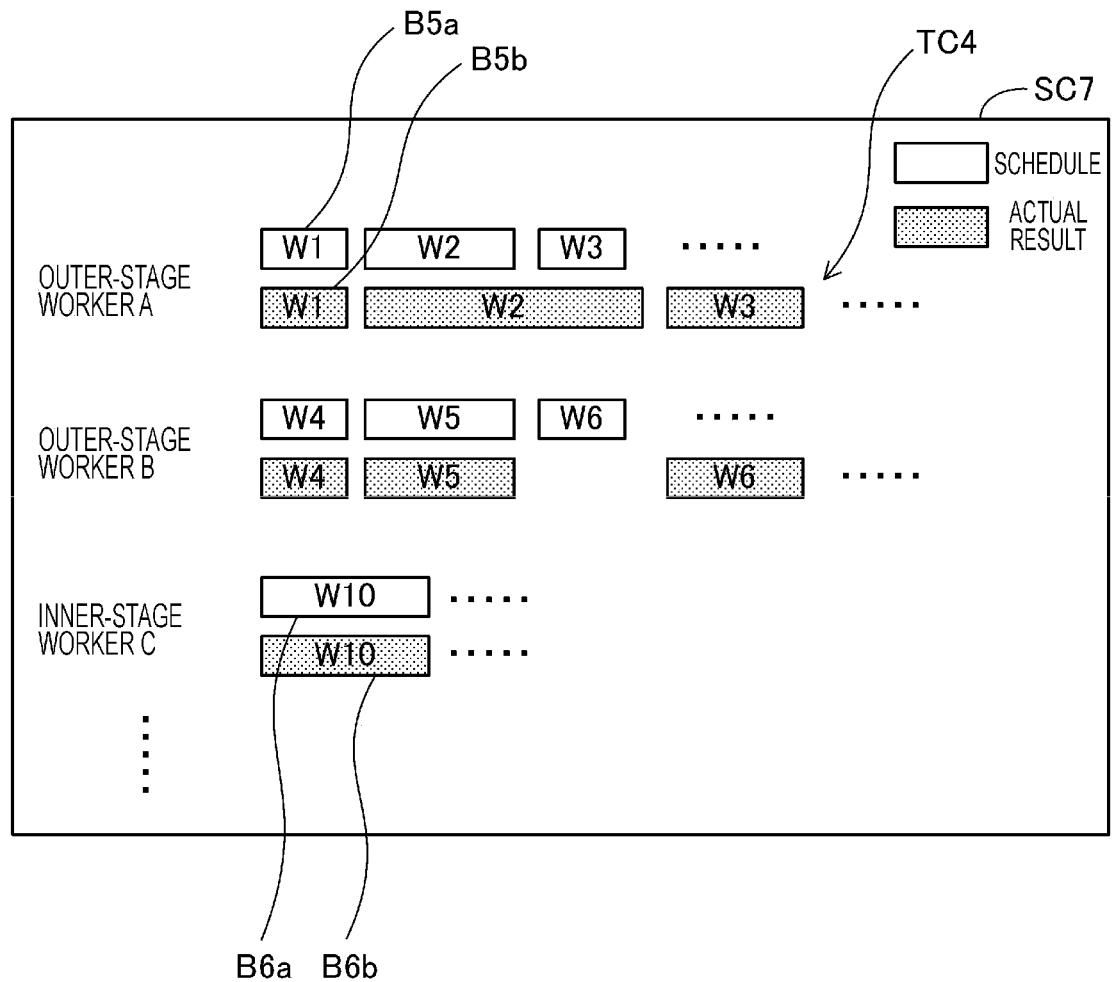
FIG. 12 illustrates a third time chart displayed by the analysis support device.

In the present embodiment, the user can select the display of screen SC7 in FIG. 12 instead of screen SC4 in FIG. 9. For example, the user selects display switching button BT on screen SC4. When display switching button BT is selected, analysis support device 10 displays screen SC7 on display 14.

Screen SC7 includes third time chart TC4. Third time chart TC4 is a time chart in which second time chart TC2 of FIG. 9 is reorganized for each subject (for example, a worker) performing the preparation step. For example, the external setup step is performed by two workers such as outer-stage worker A and outer-stage worker B. Outer-stage worker A handles multiple partial steps W1 to W3, and outer-stage worker B handles multiple partial steps W4 to W6. Third time chart TC4 includes a scheduled box and an actual result box for each of multiple partial steps W1 to W3. For example, in scheduled box B5a of partial step W1, the left end indicates a start scheduled time at which partial step W1 is to be started, and the right end indicates an end scheduled time at which partial step W1 is to be ended. In actual result box B5b of partial step W1, the left end indicates an actual start time of partial step W1, and the right end indicates an actual end time of partial step W1 or a current time during performance. The scheduled boxes and the actual result boxes of the other partial steps W2 to W6 also have the same configurations as scheduled box B5a and actual result box B5b of partial step W1.

In addition, as illustrated in FIG. 12, third time chart TC4 also includes a scheduled box (for example, B6a) and an actual result box (for example, B6b) of one or more partial steps handled by the worker, for each of one or more workers performing a preparation step (for example, an internal setup step) other than the external setup step.

As illustrated in third time chart TC4 of FIG. 12, in this case, the actual result time is delayed from the scheduled time in partial step W2 of outer-stage worker A. The user views third time chart TC4 and analyzes that the main cause of the delay of the device actual result time from the device scheduled time is the delay of partial step W2 by outer-stage worker A.

Effects of Present Embodiment

With the configuration of the present embodiment, the user can know the delay of the mounting step by viewing pie chart G3 on screen SC2 of FIG. 7. Then, the user can view screen SC4 in FIG. 9 by selecting the image corresponding to legend L4 in pie chart G3 after screen SC2 is displayed. The user views second time chart TC2 on screen SC4 and can know the presence or absence of a delay in the preparation step as a cause of a delay in the mounting step. In this case, since actual result box B2b is longer than scheduled box B2a in the external setup step of second time chart TC2, the user can know the delay of the external setup step as one of the causes of the delay of the mounting step. According to the present embodiment, it is possible to support the analysis by the user of the cause of the delay of the actual result time of the mounting step from the scheduled time.

In the present embodiment, analysis support device 10 displays second time chart TC2 including the scheduled box and the actual result box for each of the picking step, the external setup step, and the internal setup step (FIG. 9). According to such a configuration, the user can know the presence or absence of a delay of each step in each of the picking step, the external setup step, and the internal setup step as one unit.

In the present embodiment, analysis support device 10 displays third time chart TC4 including scheduled boxes and actual result boxes for each of multiple workers (FIG. 12). With such a configuration, the user can know the presence or absence of a delay for each of the partial steps with the subject of the work of the preparation step as one unit.

In the present embodiment, when the screen corresponding to legend L4 in pie chart G3 of FIG. 7 is selected, analysis support device 10 displays screen SC4 including second time chart TC2 (FIG. 9). Legend L4 corresponds to the third standby state "Part Supply", and the delay in the standby state may be caused by the delay in the preparation of the electronic component in the preparation step. When the screen corresponding to legend L4 in pie chart G3 is selected, analysis support device 10 estimates the presence or absence of a delay in the preparation step using the preparation state information. When a delay in the preparation step is estimated, analysis support device 10 displays screen SC4 including second time chart TC2. Meanwhile, when the delay of the preparation step is not estimated, analysis support device 10 displays a screen (for example, screen SC6 including error table ET) other than screen SC4.

Figure 11:
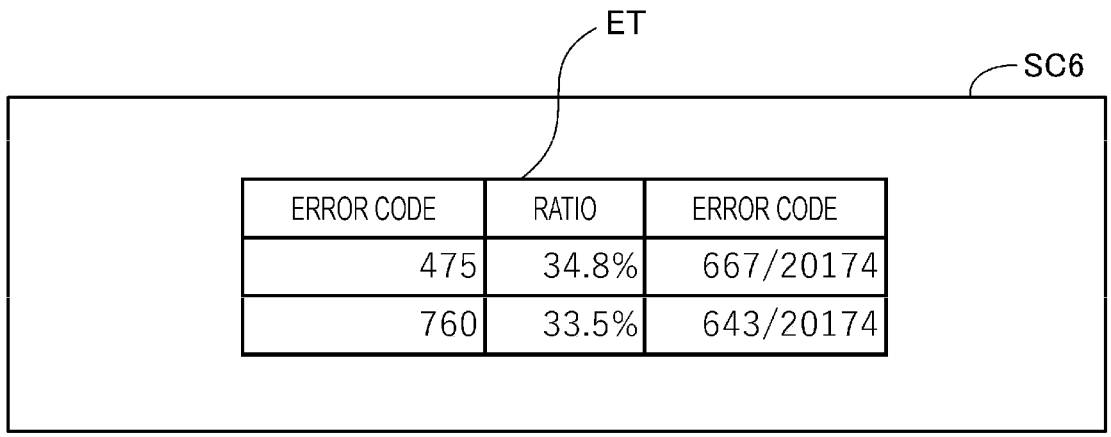
FIG. 11 illustrates an error table displayed by the analysis support device.

In the present embodiment, when the image corresponding to legend L1 in pie chart G3 is selected, analysis support device 10 displays screen SC6 including error table ET (FIG. 11). Legend L1 corresponds to the implementation state "Product", and there is a possibility that the delay of the implementation state is not a delay of the preparation step but is caused by an abnormality occurring inside mounting device 100. When the screen corresponding to legend L1 in pie chart G3 is selected, analysis support device 10 estimates the presence or absence of an abnormality occurring inside mounting device 100 using the operation state information. When the occurrence of an abnormality is estimated, analysis support device 10 displays screen SC6 including error table ET. Meanwhile, when the occurrence of an abnormality is not estimated, analysis support device 10 displays a screen (for example, screen SC4 including second time chart TC2) other than screen SC6.

As described above, when the image corresponding to legend in pie chart G3 is selected, analysis support device 10 selectively displays screen SC4 or screen SC6 using the operation state information and the preparation state information. The user need not select which of screen SC4 and screen SC6 is to be displayed. The convenience of the user can be improved.

(Correspondence Relationship)

Simulation device 200, calculation device 300, mounting device 100, and analysis support device 10 are examples of a "simulation device", a "calculation device", a "mounting device", and an "analysis support device", respectively. A system including simulation device 200, calculation device 300, and analysis support device 10 is an example of an "analysis support system". Display 14 and control section 30 are examples of "display" and "first to fourth display control sections", respectively.

Screen SC2, the scheduled image of pie chart G3, and the combined image of the scheduled image and the unscheduled image of pie chart G3 in FIG. 7 are examples of a "first screen", a "device scheduled image", and a "device actual result image", respectively. Selecting the image corresponding to legend L4 in pie chart G3 is an example of a "first instruction". Screen SC4 in FIG. 9 is an example of a "second screen". When screen SC4 is the "second screen", the scheduled box in second time chart TC2 and the actual result box in second time chart TC2 are examples of the "preparation scheduled image" and the "preparation actual result image", respectively. Screen SC7 in FIG. 12 is also an example of the "second screen". When screen SC7 is the "second screen", the scheduled box in third time chart TC4 and the actual result box in third time chart TC4 are examples of the "preparation scheduled image (and scheduled box)" and the "preparation actual result image (and actual result box)". The worker is an example of a "subject".

Selecting the image corresponding to legend L1 in pie chart G3 is an example of a "second instruction". Screen SC6 in FIG. 11 is an example of a "third screen". Selecting any one of legends L1 to L9 in pie chart G3 is an example of a "third instruction".

The points of attention relating to the display device and the system described in the embodiments will be described. The "first screen" is not limited to the screen including pie chart G3, and may be, for example, a screen including a bar graph indicating a ratio of the actual result time and the scheduled time per unit time, a table indicating a numerical value of the ratio, and the like.

The "second screen" is not limited to the screen including second time chart TC2, and may be, for example, a screen including a table indicating numerical values of a start scheduled time, an end scheduled time, an actual start time, and an actual end time in each preparation step.

Any one of screen SC4 of FIG. 9 and screen SC7 of FIG. 12 may be displayed. In the present modification example, one of the screens is an example of a "second screen".

The subject in third time chart TC4 of screen SC7 in FIG. 12 is not limited to the worker, and may be, for example, a robot that automatically performs the preparation step.

Screen SC6 of FIG. 11 need not be displayed. In the present modification example, the "third screen" can be omitted.

Analysis support device 10, simulation device 200, and calculation device 300 may be achieved as one device. In the present modification example, the one device is an example of the "analysis support device". Component mounting system 2 need not include simulation device 200. In this case, the device scheduled time and the preparation scheduled time may be generated by the user.

In the embodiment, simulation device 200 and calculation device 300 are connected to LAN 4. Alternatively, simulation device 200 and calculation device 300 may be installed on the Internet, and LAN 4 to which analysis support device 10 is connected may be connected to the Internet.

Technical elements described in the present description or the drawings exhibit technical usefulness alone or in various combinations, and are not limited to combinations described in claims at the time of filing. In addition, the technology described in the present description or the drawings simultaneously achieves multiple purposes, and has technical usefulness with achieving one purpose itself of the multiple purposes.

REFERENCE SIGNS LIST

2: component mounting system, 4: LAN, 10: analysis support device, 12: communication I/F, 14: display, 16: operation section, 30: control section, 32: CPU, 34: memory, 40: program, 100: mounting device, 102: mounting module, 104: carry-in device, 106: carry-out device, 110: cassette, 110a: component feeder, 112: support table, 114: mounting unit, 114a: nozzle, 116: nozzle box, 120: picking terminal, 140: setup terminal, 200: simulation device, 212: communication I/F, 230: control section, 232: CPU, 234: memory, 240: program, 300: calculation device, 312: communication I/F, 330: control section, 332: CPU, 334: memory, 340: program, A1: area, B1a to B5a: scheduled box, B1b to B5b: actual result box, B20a: schedule detail box, B20b: actual result detail box, BT: display switching button, ET: error table, G1: graph, G2: graph, G3: pie chart, SC1 to SC7: screen, TC1: first time chart, TC2: second time chart, TC3: enlarged time chart, TC4: third time chart, W1, W2, and W4: partial step, t1 to t5: time

The invention claimed is:

1. An analysis support device comprising:
a display;
a first display control section configured to display a first screen including a device scheduled image and a device actual result image on the display when a device actual result time at which a mounting device actually performs a mounting step of mounting a component on a substrate is delayed from a device scheduled time at which the mounting device is to perform the mounting step, the device scheduled image indicating the device scheduled time, the device actual result image indicating the device actual result time, and the device actual result time being longer than the device scheduled time; and
a second display control section configured to display a second screen including a preparation scheduled image and a preparation actual result image on the display when a predetermined first instruction is given by a user after the first screen is displayed on the display, the preparation scheduled image indicating a preparation scheduled time at which a preparation step, which is preparation for the mounting step, is to be performed, and the preparation actual result image indicating a preparation actual result time at which the preparation step is actually performed.

2. The analysis support device according to claim 1, wherein the preparation scheduled image and the preparation actual result image are boxes,
a first end of the preparation scheduled image indicates a start scheduled time at which the preparation step is to be started,
a second end of the preparation scheduled image indicates an end scheduled time at which the preparation step is to be ended,
a first end of the preparation actual result image indicates an actual start time of the preparation step, and
a second end of the preparation actual result image indicates an actual end time of the preparation step.

3. The analysis support device according to claim 1, wherein the preparation step includes, for each of two or more subjects, multiple partial steps handled by the subject,
the preparation scheduled image includes multiple scheduled boxes corresponding to the multiple partial steps,
for each of the multiple scheduled boxes, a first end of the scheduled box indicates a start scheduled time at which the partial step corresponding to the scheduled box is to be started, and a second end of the scheduled box indicates an end scheduled time at which the partial step corresponding to the scheduled box is to be ended,
the preparation actual result image includes multiple actual result boxes corresponding to the multiple partial steps, and
for each of the multiple actual result boxes, a first end of the actual result box indicates an actual start time of the partial step corresponding to the actual result box, and a second end of the actual result box indicates an actual end time of the partial step corresponding to the actual result box.

4. The analysis support device according to claim 1, further comprising a third display control section configured to display a third screen not including the preparation actual result image and the preparation scheduled image on the display when a predetermined second instruction is given by the user after the first screen is displayed on the display,
  wherein the third screen includes information related to an abnormality occurring inside the mounting device.

5. The analysis support device according to claim 4, further comprising a fourth display control section configured to selectively display the second screen or the third screen based on state information indicating an actual operation state of the mounting device and an actual preparation state in the preparation step when a predetermined third instruction is given by the user after the first screen is displayed on the display.

6. An analysis support system comprising:
  a simulation device configured to simulate a device scheduled time at which a mounting device is to perform a mounting step of mounting a component on a substrate, and a preparation scheduled time at which a preparation step, which is preparation for the mounting step, is to be performed;
  a calculation device configured to calculate a device actual result time at which the mounting device actually performs the mounting step and a preparation actual result time at which the preparation step is actually performed using state information indicating an actual operation state of the mounting device and an actual preparation state in the preparation step; and
  an analysis support device configured to communicate with the simulation device and the calculation device,
  wherein the analysis support device includes
  a display,
  a first display control section configured to display a first screen including a device scheduled image and a device actual result image on the display when the device actual result time is delayed from the device scheduled time, the device scheduled image indicating the device scheduled time, the device actual result image indicating the device actual result time, and the device actual result time being longer than the device scheduled time, and
  a second display control section configured to display a second screen including a preparation scheduled image and a preparation actual result image on the display when a predetermined first instruction is given by a user after the first screen is displayed on the display, the preparation scheduled image indicating the preparation scheduled time, and the preparation actual result image indicating the preparation actual result time.

* * * * *